(12) United States Patent
La

(10) Patent No.: US 6,738,876 B2
(45) Date of Patent: May 18, 2004

(54) APPARATUS AND METHOD FOR PRESERVING A REGION CODE FOR AN OPTICAL DISK DRIVE

(75) Inventor: Seong Eon La, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/803,927

(22) Filed: Mar. 13, 2001

(65) Prior Publication Data

US 2001/0029568 A1 Oct. 11, 2001

(30) Foreign Application Priority Data

Mar. 13, 2000 (KR) ........................................ 2000-12401

(51) Int. Cl.[7] .............................................. G06F 12/00
(52) U.S. Cl. ...................... 711/163; 711/164; 386/94; 386/126; 369/30.03
(58) Field of Search .................................. 711/163, 164; 713/202; 705/51; 360/60; 386/94, 126; 369/30.03

(56) References Cited

U.S. PATENT DOCUMENTS

| | | | | |
|---|---|---|---|---|
| 4,577,289 A | * | 3/1986 | Comerford et al. ............ 360/60 |
| 4,670,857 A | * | 6/1987 | Rackman ...................... 705/51 |
| 5,430,675 A | * | 7/1995 | Yajima et al. ......... 365/185.04 |
| 5,450,489 A | * | 9/1995 | Ostrover et al. ............... 705/51 |
| 5,535,355 A | * | 7/1996 | Scales ......................... 711/101 |
| 6,014,755 A | * | 1/2000 | Wells et al. .................... 714/8 |
| 6,052,803 A | * | 4/2000 | Bhatia et al. .................. 714/49 |
| 6,393,561 B1 | * | 5/2002 | Hagiwara et al. ........... 713/100 |

FOREIGN PATENT DOCUMENTS

JP            360232000            * 11/1985

* cited by examiner

Primary Examiner—Donald Sparks
Assistant Examiner—Ngoc Dinh
(74) Attorney, Agent, or Firm—Birch, Stewart, Kolasch & Birch, LLP

(57) ABSTRACT

An apparatus and method for preserving a region code for an optical disk drive in an internal flash memory contained in a microcomputer. This region code preserving method receives a region code to be written, copies a part of the firmware for the optical disk drive stored in memory means to an external memory, and writes the received region code in the memory means separately from the firmware by the execution of the copied firmware.

18 Claims, 3 Drawing Sheets

APPARATUS AND METHOD FOR PRESERVING A REGION CODE FOR AN OPTICAL DISK DRIVE

BACKGROUND OF THE INVENTION

1. Field of the Invention

The present invention relates to an apparatus and method for preserving a region code for an optical disk drive in an internal flash memory contained in a microcomputer.

2. Description of the Related Art

Since the DVD industry split the world up in several DVD regions to prevent illegal copy and distribution of DVD disks, every DVD disk has a region code. DVD disks with a region code will be only playbacked on DVD players with the same region code.

FIG. 1 shows a block diagram of a DVD-ROM drive that supports Region Playback Control II (RPC II). The DVD-ROM drive stores its region code in an external flash memory 71 or an EEPROM.

When a DVD disk is loaded, the DVD-ROM drive compares its region code with that of the DVD disk. If they do not match, the DVD-ROM drive will not play the DVD disk. The region code of a DVD-ROM drive can be changed up to five times by users and can be initialized up to five times by sellers; hence, it can be changed up to 25 times.

The change of the region code is carried out by the ATAPI command "Send Key" transferred through an interface unit 51 from an external host. On receiving the command "Report Key" from the external host, the DVD-ROM drive reads the current region code and sends it to the host.

Because the region code of a DVD-ROM drive should be preserved during power-off and also be rewritable, it is commonly stored in an external flash memory 71 as shown in FIG. 1. However, the employment of the flash ROM increases the manufacturing cost of an optical disk drive and also increases the size of the printed circuit board (PCB). Instead of the flash memory, an EEPROM can be adopted to store the region code. In this case, the control of the EEPROM requires several I/O ports of the microcomputer, which also leads to design and manufacturing cost problems.

SUMMARY OF THE INVENTION

It is an object of the present invention to provide an apparatus and method for preserving a region code for an optical disk drive without an external flash memory.

The method for preserving a region code for an optical disk drive in accordance with the present invention comprises the steps of receiving a region code to be written, copying a part of the firmware for the optical disk drive stored in memory means to an external memory, and writing the received region code in the memory means separately from the firmware by the execution of the copied firmware.

The apparatus for preserving a region code for an optical disk drive in accordance with the present invention comprises an interface unit receiving a region code to be written from an external host, a first memory storing the firmware for the optical disk drive, a second memory for storing a part of the firmware, and a control unit copying a part of the firmware stored in the first memory to the second memory and storing the received region code in the first memory by separating the region code from the firmware.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings.

DETAILED DESCRIPTION OF THE PREFFERRED EMBODIMENT

In order that the invention may be fully understood, the preferred embodiment thereof will now be described with reference to the accompanying drawings.

Figure 1:
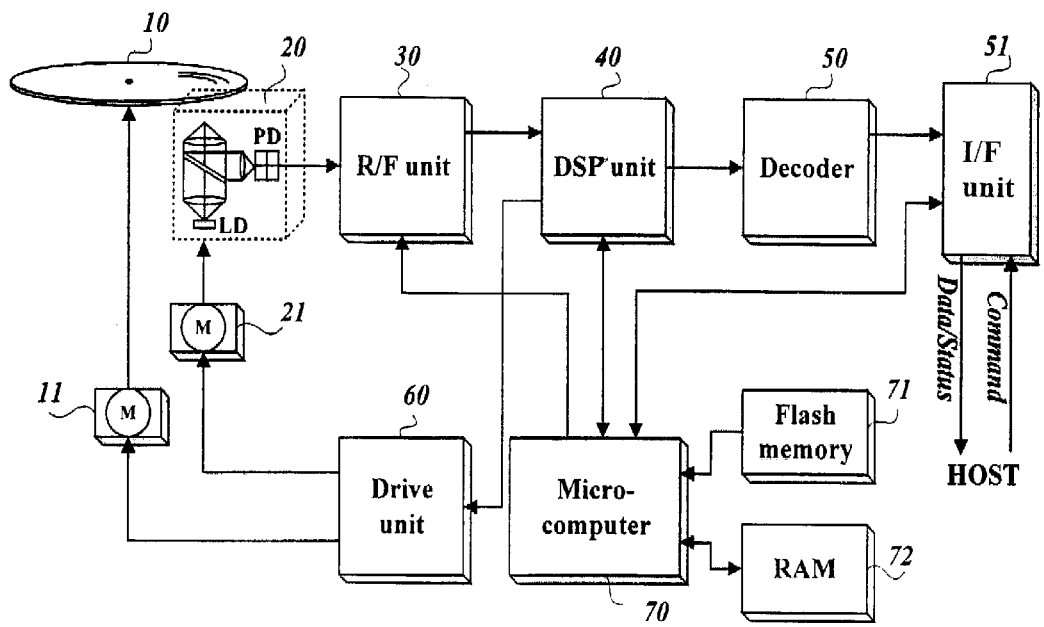
FIG. 1 is a block diagram of a conventional DVD-ROM drive.
Figure 2:
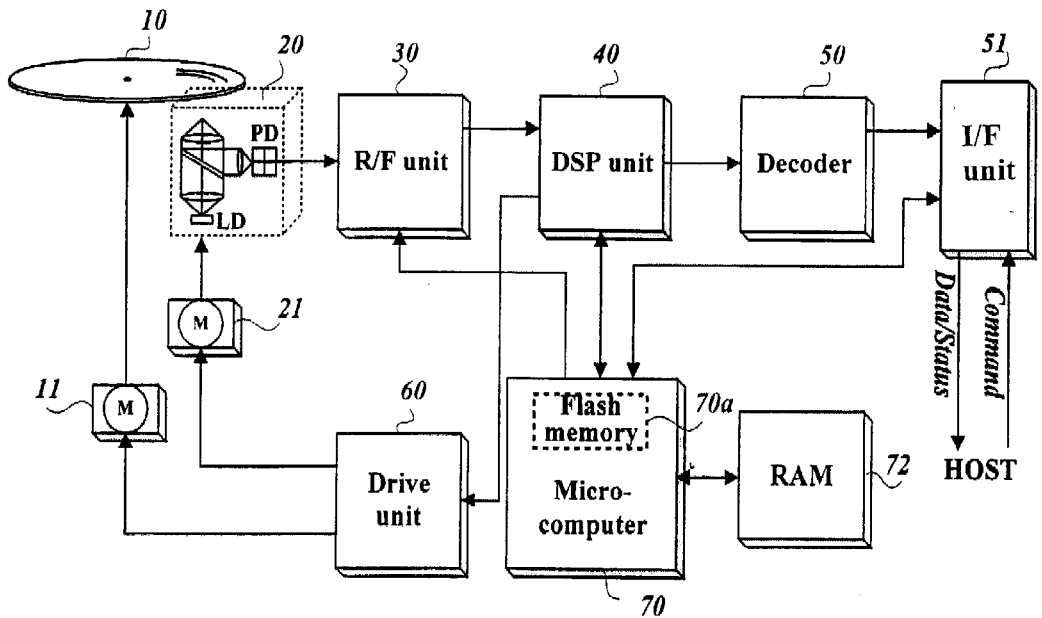
FIG. 2 is a block diagram of the DVD-ROM drive in which the present invention may be advantageously practiced.

FIG. 2 is a block diagram of the optical disk drive embodying the present invention, comprising a spindle motor 11 for rotating a DVD-ROM disk 10, an optical pickup 20 for reproducing signals recorded on the disk 10, a sled motor 21 for moving the optical pickup 20 along the full length of the disk radius, an R/F unit 30 for equalizing and shaping the RF signals reproduced by the optical pickup 20, a digital signal processing unit 40 for processing the binary data stream received from the R/F unit 30 to retrieve digital data, a decoder 50 for decoding the retrieved digital data, an interface unit 51 for exchanging data with an external host like a PC through the IDE bus, a drive unit 60 for driving the spindle motor 11 and the sled motor 21, a RAM 72 for storing data temporarily, and a microcomputer 70 for supervising overall operation of the drive system, the microcomputer 70 containing an internal flash memory 70a to store the firmware and the region code of the optical disk drive.

Figure 3:
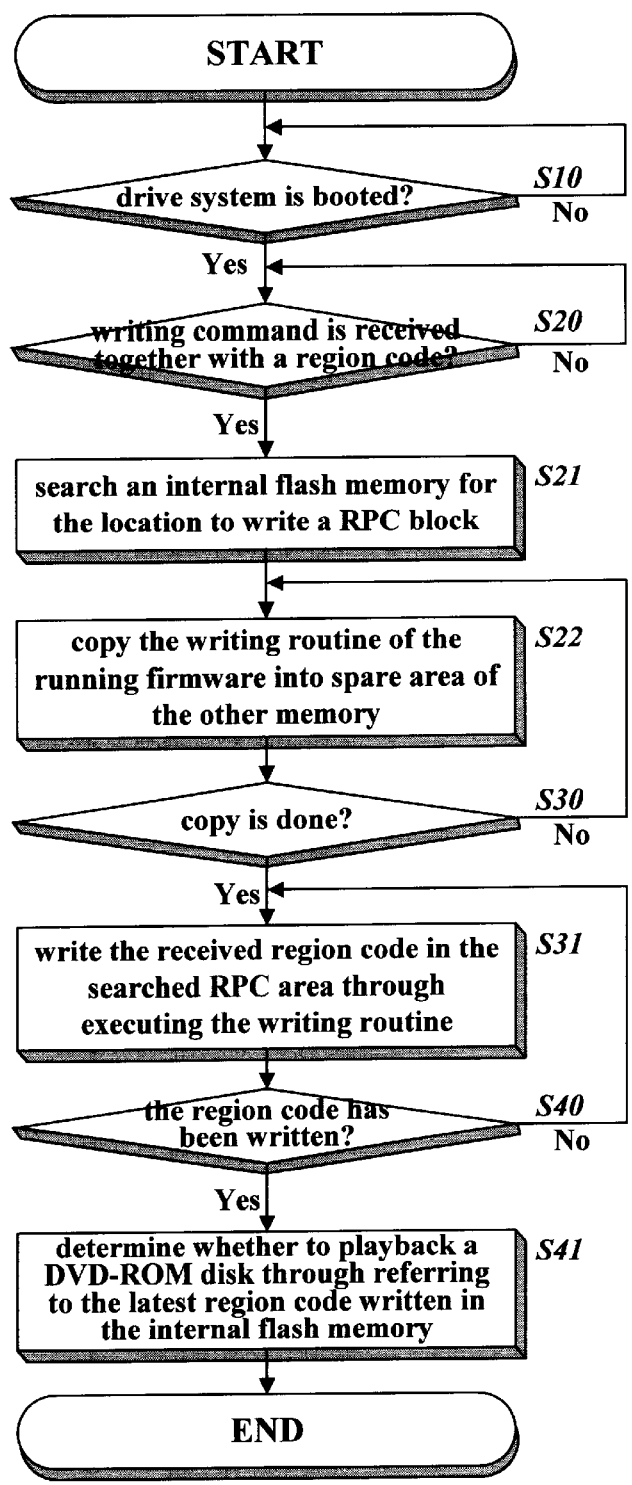
FIG. 3 is a flow diagram of the method in accordance with an embodiment of the present invention.

FIG. 3 is a flow diagram of the method for writing the region code for the optical disk drive in accordance with an embodiment of the present invention, which will be explained in detail with reference to FIG. 2.

It is assumed that an external host interfaced through the IDE bus with the optical disk drive shown in FIG. 2 receives a region code from the system operator and the optical disk drive contains firmware that controls the operation of the drive. By request of the operator, the host sends the region code to the optical disk drive so that the region code may be written.

The firmware for the microcomputer 70 and the region code have been written in the flash memory 70a contained in the microcomputer 70, the firmware and region code being separated from each other. The firmware is responsible for the overall operation of the microcomputer 70 such as system initialization, hardware control, data read-out, and so forth.

Figure 4:
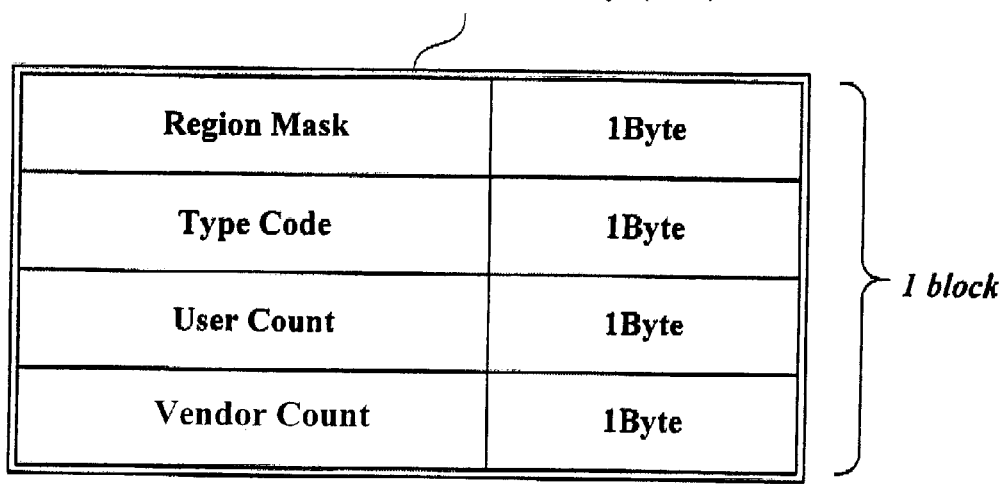
FIG. 4 is a schematic diagram of the region code written in the flash memory in FIG. 2.

The region code is written in a predefined area of the flash memory 70a as a 4-byte Region Playback Control (RPC) block as shown in FIG. 4. Since the region code can be modified up to 25 times as mentioned above, the predefined region code area is of a size of 25 RPC blocks.

On the condition that the flash memory 70a contains the firmware for the microcomputer 70 and an empty space is reserved for the region code, the drive system boots at power-on (S10). After the booting completes, the microcomputer 70 is ready to communicate with the external host.

If the operator runs a communication program and requests writing of a region code, the host sends the command "SendKey" to the interface unit 51 through the IDE bus for writing the region code.

On receiving the command "SendKey" and the region code from the host (S20), the microcomputer 70 searches the internal flash memory 70a for the location in which the RPC block is written (S21). Since the flash memory 70a outputs the value of 'FFh' if not written, the location can be found by searching for a 4-byte area reading as 'FFh'. Then, the microcomputer 70 reads the previous RPC block and stores the number of region code writing.

The microcomputer 70 copies the writing routine of the running firmware stored in the flash memory 70a to an unused area of the RAM 72 (S22). Since the RAM 72 stores data and variables needed by the firmware, the unused area may not be enough to save the writing routine. If so, some data or variables are first copied to the buffer of the decoder 50. This is possible because the buffer is not being used while the writing routine is executed.

After copying the contents of the RAM 72 to the buffer, the microcomputer 70 copies the writing routine stored in the flash memory 70a to the RAM 72 (S30). Then, the microcomputer 70 executes the writing routine stored in the RAM 72 and writes the received region code in the searched RPC area of the flash memory 70a (S31).

While the writing routine stored in the flash memory 70a is executed, it is impossible to write data in an arbitrary area of the flash memory 70a. This is why the contents of the flash memory 70a is copied to the RAM 72 before data is written in the flash memory 70a.

When the writing routine stored in the RAM 72 is executed, the writing routine increment by 1 the number of region code writing stored previously and writes the RPC block containing the incremented number in the reserved RPC area.

In this embodiment, the flash memory 70a has reserved space enough to store up to 25 PRC blocks and a new region code is written without erasing previously-written region codes. This is because some flash memorys do not support random erase operations. Even if random erase is available, the erase operation tends to have precise timing requirements and thus may cause errors, which can be prevented by the method of the embodiment.

If the 25th RPC block has been written, the microcomputer 70 does not respond to the next writing requests and thus the 25th RPC block is used as a permanent region code.

If the execution of the writing routine stored in the RAM 72 finishes (S40), the microcomputer 70 returns the program flow to the routine for completing the write operation. If necessary, the microcomputer 70 moves the data copied to the buffer of the decoder 50 back to the RAM 72, thereby the contents of the RAM 72 being preserved with no data loss.

After the operation for writing the region code has been completed, the microcomputer 70 uses the latest region code written in the internal flash memory 70a to determine whether to perform the playback of the requested DVD-ROM disk 10 (s41):

The apparatus and method for preserving a region code for an optical disk drive can reduce the volume and manufacturing cost of the optical disk drive because an additional memory for storing the region code and circuits for the memory are not required.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method for writing a region code for a storage medium apparatus, comprising:
   receiving a region code for limiting playback according to region, which can be changed by a user wherein the changed region code is appended to and separated from an area in a memory where a previous region code has been recorded;
   copying a part of firmware for the storage medium apparatus to an external memory;
   writing the received region code into an area in the memory by execution of the copied firmware; and
   playing a storage medium inserted into the storage medium apparatus, based on the results of a comparison between the appended region code and a region code contained in the storage medium.

2. The method set forth in claim 1, wherein said memory is an internal flash memory contained in a microcomputer.

3. The method set forth in claim 1, wherein copying a part of firmware further comprises the step of copying the data of said external memory to an additional external memory.

4. The method set forth in claim 3, wherein said additional external memory is a memory used as a buffer for decoding means decoding data reproduced from said optical medium.

5. The method set forth in claim 1, wherein writing the received region code in said area in the memory includes writing the received region code while preserving previously-written region codes.

6. The method set forth in claim 5, wherein writing the received region code while preserving previously written region codes writes the received region code in an area next to the previously-written region codes.

7. An apparatus for preserving a region code for a storage medium apparatus, comprising:
   an interface unit receiving a region code for limiting a playback according to region, which can be changed by a user, wherein the changed region code is appended to and separated from an area in a memory where a previous region code has been recorded;
   a first memory storing a firmware for the storage medium apparatus;
   a second memory to store a part of said firmware;
   a third memory to store the contents of the second memory;
   a control unit copying a part of said firmware stored in said first memory to said second memory and storing the received region code in said first memory by separating the region code from the firmware; and
   a microcomputer determining whether to perform a requested of an storage medium based on a comparison between the region code to be written and a region code contained in the storage medium.

8. The apparatus set forth in claim 7, wherein said first memory is an internal flash memory contained in said control unit.

9. A method for writing a region code for storage medium apparatus, comprising:
   receiving a region code for limiting a playback according to region, which can be changed by riser, wherein the changed region code is appended to and separated from an area in a memory where a previous region code has been recorded;

copying the contents of an external memory to a buffer;

copying a part of firmware for the storage medium apparatus to an external memory, said firmware being stored in said memory means;

writing the received region code into an area in the memory by execution of the copied firmware, said firmware and said received region code being separated from each other in said memory means; and playing a storage medium inserted into said storage medium apparatus, based upon a comparison between the written region code and a region code contained in the optical storage medium.

10. The method set forth in claim 1, wherein the memory is searched for a value indicating that a region code is not written.

11. The method set forth in claim 1, wherein a fixed maximum number of region codes can be written.

12. The method of claim 11, wherein a fixed maximum number of region codes that can be written is 25.

13. The method set forth in claim 9, wherein said memory is an internal flash memory contained in a microcomputer.

14. The method set forth in claim 9, wherein writing the received region code in a first location includes writing the received region code while preserving previously-written region codes.

15. The method set forth in claim 14, wherein writing the received region code in said first location while preserving previously written region codes writes the received region code in an area next to the previously-written region codes.

16. The method set forth in claim 9, wherein execution of the copied firmware increments the number of region codes written previously by one.

17. The apparatus set forth in claim 9, wherein said memory means is an internal flash memory contained in a control unit.

18. The method set forth in claim 9, wherein said buffer is used as a decoding means decoding data reproduced from said optical medium.

* * * * *